Nov. 27, 1951  J. H. GRUVER  2,576,598
PRINTING MECHANISM FOR CASH REGISTERS
Filed March 22, 1946  3 Sheets-Sheet 1

Inventor:
John H. Gruver
By: Wallace and Cannon
Attorneys

Nov. 27, 1951   J. H. GRUVER   2,576,598
PRINTING MECHANISM FOR CASH REGISTERS
Filed March 22, 1946   3 Sheets-Sheet 2
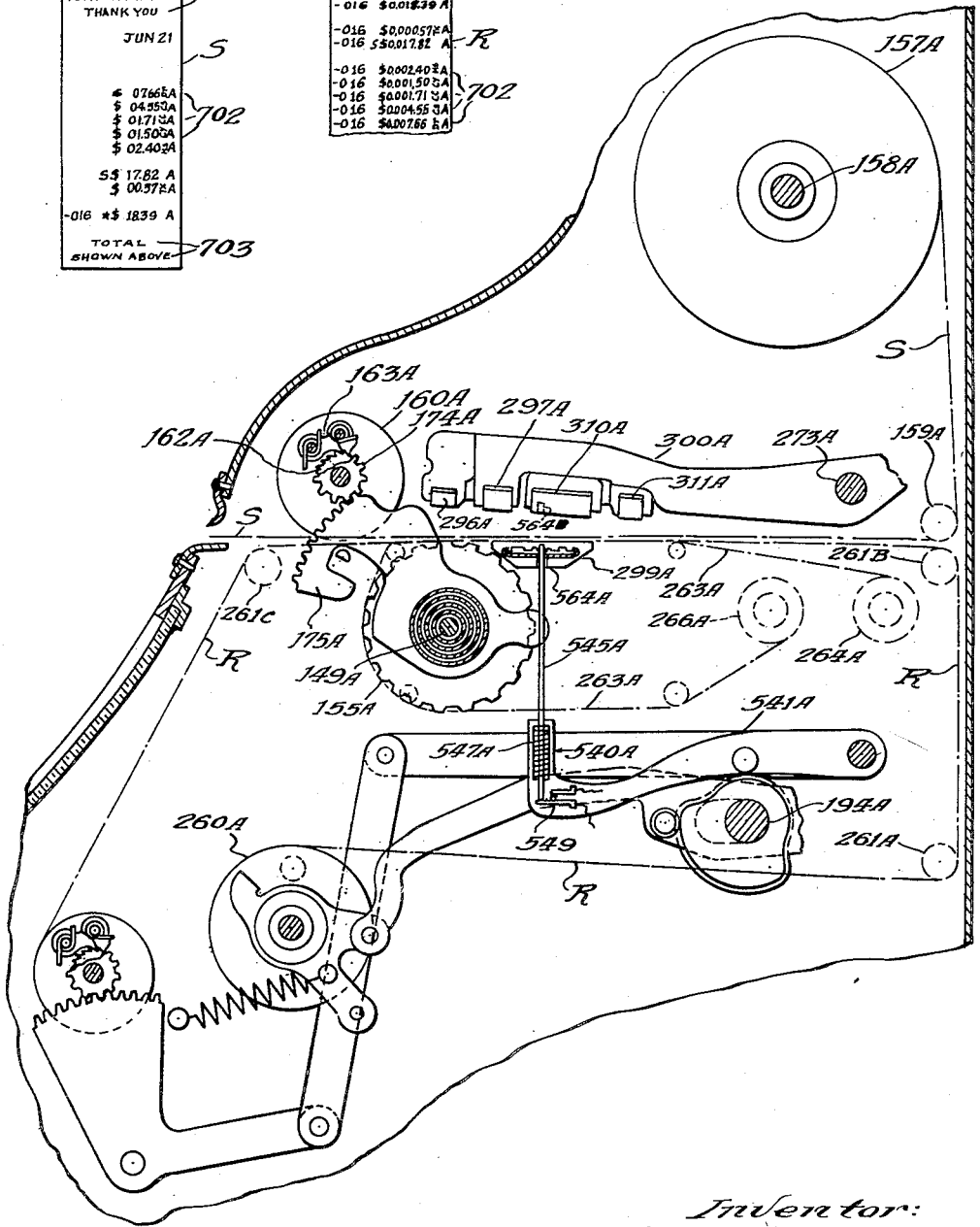
Inventor:
John H. Gruver
By Wallace and Cannon
Attorneys Nov. 27, 1951 J. H. GRUVER 2,576,598
PRINTING MECHANISM FOR CASH REGISTERS
Filed March 22, 1946 3 Sheets-Sheet 3
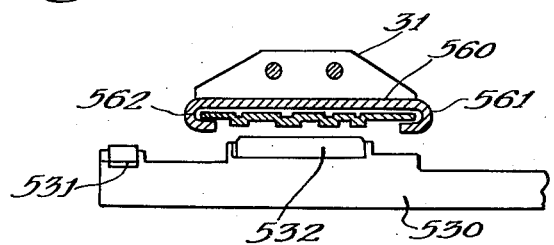
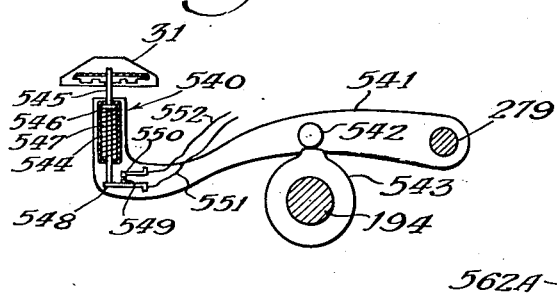
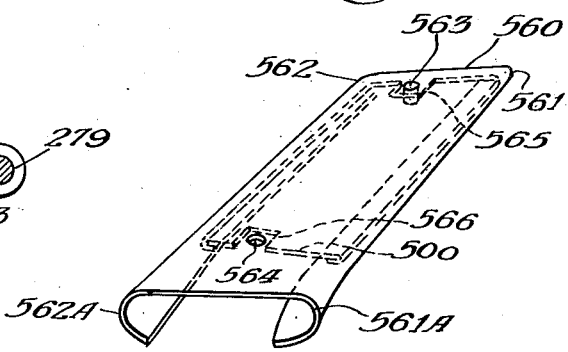
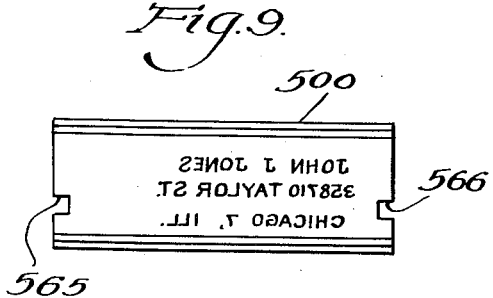
Inventor:
John H. Gruver
By: Wallace and Cannon
Attorneys ed Nov. 27, 1951

2,576,598

UNITED STATES PATENT OFFICE 2,576,598

PRINTING MECHANISM FOR CASH REGISTERS

John H. Gruver, East Cleveland, Ohio, assignor to Addressograph - Multigraph Corporation, Wilmington, Del., a corporation of Delaware Application March 22, 1946, Serial No. 656,195

1 Claim. (Cl. 101—317)

This invention relates to a cash register and more particularly to a printing mechanism within a cash register which can be controlled by individual plates or tokens such as are commonly issued by customers by large retail establishments for recording certain data pertaining to business transactions which is not normally recorded by standard commercial cash registers.

Among industrial firms and mercantile establishments and particularly among department stores and organizations employing similar business systems, it is common practice for the store or firm to provide each customer or each employee, etc. with an individual token or plate commonly called a "charge plate" or identification plate which bears the name of the individual, his address and perhaps other identifying data such as an account number or the like. These individual plates or tokens are commonly provided with raised indicia to serve as printing characters in certain types of apparatus used in connection with transactions of the character mentioned. For example, an individual who is a regular customer of the store or firm may be provided with a token or plate which, when he makes a charge purchase, will be inserted by an employee of the store or firm into an impressing device which will record the data borne by the plate or token upon a record sheet which will be used as an original entry for bookkeeping purposes of the store or firm.

In the employment of individual plates and tokens of the character mentioned above it is common practice for a clerk, for example in a charge purchase transaction, to make out a sales slip and to impress thereon the data borne by the token or plate, the presentation of such token or plate serving both to identify the customer and to correctly record the address to which merchandise and/or monthly statements and the like are to be delivered. In addition to employing the plate or token in this manner it is necessary for the employee of the store or firm not only to write out details of the transactions, which is usually done in longhand, but also to calculate and write down the amount of the purchase and to use a standard cash register which is provided by most business organizations of the character referred to for this latter purpose. Hence in order to complete the necessary records pertaining to such a transaction the store or firm employee must engage in several operations such as locating a salesbook, making out a sales slip in longhand, recording an impression of the customer's identification plate or token on at least a copy of the sales slip for the records of the business establishment and calculating and writing down the amount of the purchase which gives rise to possibility of error and is time consuming.

Inasmuch as most business organizations of the character in question are equipped with standard cash registers it is a purpose of my invention to utilize a standard cash register with relatively minor modifications to accomplish its usual function of recording the amount of a transaction and in addition to record on a permanent record slip for the firm the name and address of the customer or individual and such other data as may be borne by his individual identification plate or token. The use of such a token in a cash register obviously eliminates some of the operations mentioned above and in addition serves to eliminate certain errors which are unavoidable when calculating operations and entries are made manually.

Accordingly it is an object of my invention to adapt a standard commercial type of cash register for printing the personal identification data carried by an individual token or plate of the character mentioned above directly upon the standard permanent record which is normally retained in the register. It is a further object of my invention to accomplish the foregoing without interfering with the printing of other data normally printed in a cash register pertaining to transactions of the character mentioned above.

It is a further object of my invention to perform the necessary printing operations to accomplish the recording of necessary data, including data carried by an individual token or plate, simultaneously in a standard cash register so as to minimize the time and labor required to complete each transaction.

It is a still further object of my invention to adapt a cash register for printing from individual tokens or plates which cannot be operated unless such token or plate of authorized pattern is properly inserted into printing position within the cash register.

It is an additional object of my invention to print the name, address, and other essential identification data pertaining to an individual on both a receipt or record which is issued to him, and on the record which is retained by the business establishment, utilizing the individual token or plate for accomplishing the printing of identification data.

Other and further objects of the present invention will be apparent from the following description and claim and are illustrated in the accompanying drawings which, by way of illustration show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 2 is taken on a plane substantially as indicated by the line 2—2 of Fig. 1;

Fig. 3 is another vertical sectional view similar to Fig. 2 and taken on the same line, the elements of the printing mechanism being modified;

Figs. 4 and 5 are facsimiles of receipts of the type which may be issued by the cash register shown in Fig. 1, Fig. 4 being the standard receipt issued to a customer and Fig. 5 showing a portion of the record retained by the business establishment;

Fig. 6 is an enlarged detail view of certain elements shown in Fig. 2;

Fig. 7 is a detail view of part of the control mechanism for sensing a token and controlling a printing operation;

Fig. 8 is a detail view in perspective of means for holding an individual plate or token in printing position within the cash register;

Fig. 9 is a plan view of one type of individual plate or token which may be used with my invention; and Fig. 10 is a plan view of another well known type of plate or token which may be used with my invention.

Figures 1, 2:
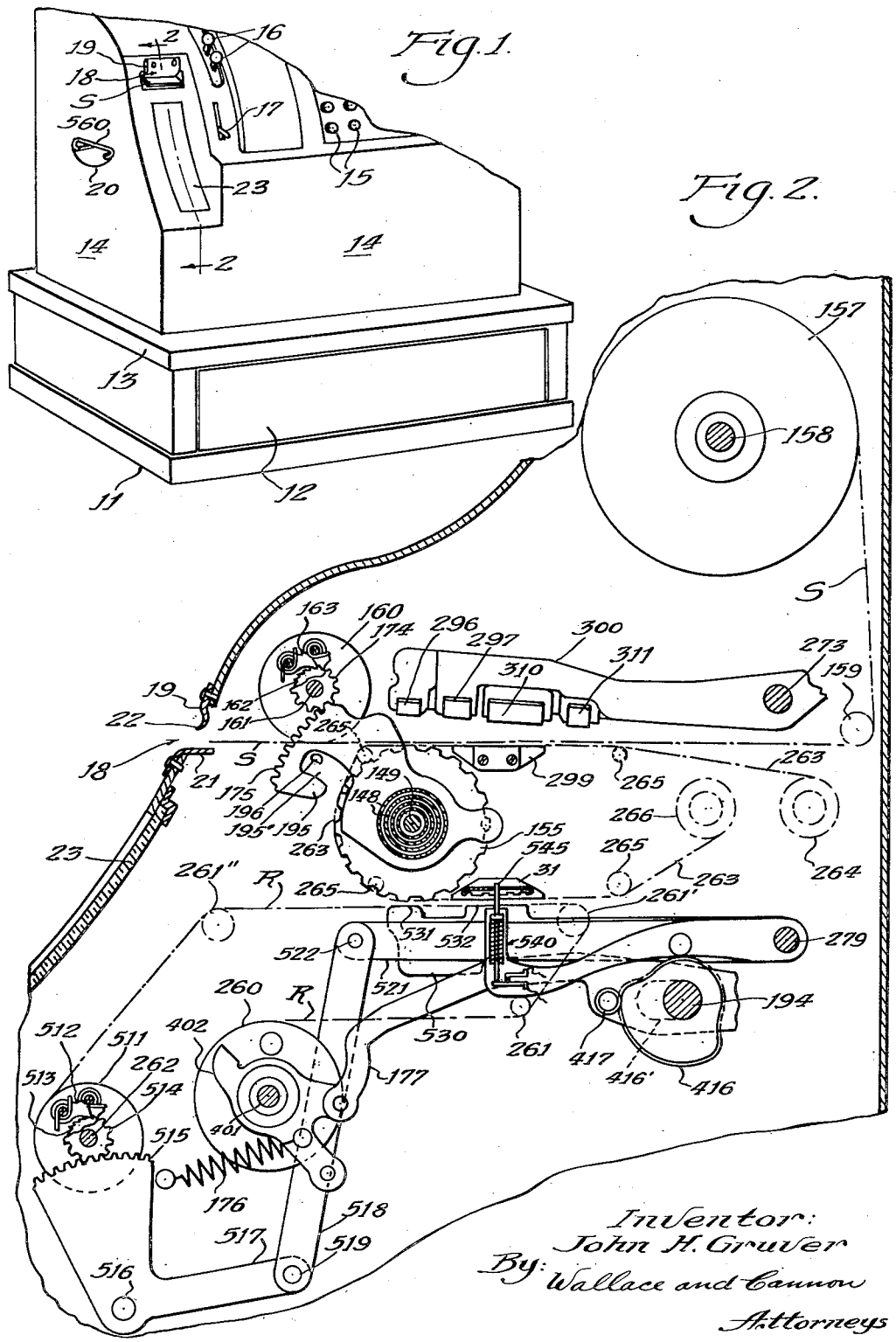
Fig. 1 is a fragmentary front view of a cash register embodying my invention.
Fig. 2 is a partial vertical sectional view showing the printing mechanism in a cash register of the type illustrated in Fig. 1, certain parts being broken away to show operating mechanisms more clearly.

Cash registers of the type to which my invention may be applied are of well known standard design being exemplified by the mechanisms shown in the patents to Shipley, No. 1,817,883, patented August 4, 1931 and No. 1,865,147, patented June 28, 1932. Patent No. 2,154,381, dated April 11, 1939 issued to me, shows certain details in a cash register of the same general type for separate printing upon two strips of paper, one strip being printed and issued as a receipt and the other strip being printed simultaneously with the receipt but rewound within the cash register and retained for record purposes.

A typical sales slip or receipt S, as issued by cash registers of the type referred to above is shown in Fig. 4 and a portion of a record strip R which my invention is adapted to produce is shown in Fig. 5. It will be noted that the receipt S bears certain standard data and also variable data such as the amounts of certain items, their subtotal, a sales tax computation and a final total. The record strip R, bears data identifying the individual with whom the transaction was made. The identification data, which may be a name and address, and other matter if desired, is printed on the record strip by means and in a manner to be described below from an individual plate or token which may be of the character shown in Tomlinson Patent No. 1,151,501 dated August 24, 1915 or that shown in Sand Patent No. 2,342,699 dated February 29, 1944, as shown in Figs. 9 and 10, respectively, of the accompanying drawings. The variable data pertaining to the transaction carried by the receipt S is also printed on the record strip, the order of the items appearing in reverse but otherwise being identical. It will be noted particularly that both records include a transaction number shown as "016" which serves to key the receipt issued to the customer with the record retained in the machine. This serves as a means for identifying the particular transaction if any question comes up subsequently regarding such transaction.

Referring now particularly to Figs. 1 and 2, the cash register which as stated above is generally of standard design comprises a base member 11, a cash drawer section 12 which may have one or more sliding drawers therein to receive cash or to keep various records and accessories, and an upper base member 13 on which the cash register mechanism proper is mounted. The registering mechanism is enclosed in a housing 14 and includes various operating mechanisms which are not shown but are shown in detail in the two Shipley patents and in my Patent No. 2,154,381 mentioned above. The cash register shown in Fig. 1 includes keys 15 and 16 and a control lever 17, all of which are shown and described in detail in the aforesaaid patents.

As shown in Fig. 1, a printing mechanism is arranged at the left side of the register mechanism to print data pertaining to business transactions upon a receipt slip S and upon a record strip R, Fig. 2. While the mechanism just mentioned is shown at the left in Fig. 1 it is sometimes arranged on the right-hand side in cash registers of otherwise quite similar design, and it will be understood that the printing mechanism may be arranged at any convenient point within the cash register for the insertion of a token or plate of the type mentioned previously herein. It is necessary that the printing mechanism be at some location which is reasonably accessible for plate insertion. Since it is also necessary that access be had to the printing mechanism for removing and replacing rolls of paper, ink ribbons and the like, the printing mechanism is almost always arranged adjacent one side or the other of the machine. Hence with minor modifications it is possible to provide for the insertion of an individual plate or token into an operative position within the printing mechanism. As shown in Fig. 1, an opening 20 is provided in the side wall of the housing 14 for this purpose.

As shown in Fig. 1 and as shown in the aforesaid Shipley patents a sales slip or receipt S is issued through an opening 18 provided in the front of the cash register. Upper and lower guides 19 and 21 are provided between which the sales slip or receipt is issued and one of these members, for example the upper guide 19, may be provided with a relatively sharp or serrated cutting edge against which the sales slip may easily be severed. If desired, however, an appropriate cutting mechanism, not shown, may be provided inside the register as is well known in the art. Below the sales slip a window 23 may be provided for observing printing which is being recorded on the permanent record strip within the machine and to observe various operations such as the proper advancing of a strip or the need for its replacement.

Fig. 2 of the accompanying drawings shows mechanism which in part is identical with that shown in Fig. 6 of my Patent No. 2,154,381 mentioned above. So far as practicable, the same reference characters have been used herein as are used in Fig. 6 of my aforesaid patent when the elements are identical. Fig. 3 of the accompanying drawings shows part of the same mechanism, certain modifications being incorporated and where the parts are identical with those shown in Fig. 2 and shown also in Fig. 6 of my aforesaid patent, the same reference characters are used with the addition of a subscript "A."

As shown in Figs. 2 and 3 and in Fig. 6 of my aforesaid patent, a supply roll is mounted in the upper portion of the printing mechanism to afford material for the printing of sales slips or receipts. In Fig. 2, this roll 157 is mounted on a shaft 158. The strip designated S herein is led from the supply roll around a guide roller 159 and thence forwardly or to the left in Fig. 2 over a stationary printing element 299 which may bear the indicia represented by the first three lines on the receipt illustrated in Fig. 4. The strip S passes on over a series of printing wheels each of which is carried by a separate sleeve 148 mounted on a central shaft 149. As illustrated, the sleeves 148 are mounted concentrically, one printing wheel 155 being carried by each sleeve for separate setting by means described more fully in my patent and in the aforesaid Shipley patents. The various printing wheels may be selectively rotated to desired position by the operation of keys as 15 of the cash register as is well known in the art. Platen means carried by an arm 300 pivotally mounted on a shaft 273 are provided for cooperating with the various printing elements mentioned above. Thus a platen segment 310 is provided for cooperation with the stationary printing element 299 and a platen element 296 is mounted at the front end of the lever 300 for cooperation with the selective printing wheels 155. Other elements shown at 297 and 311 are provided for printing certain other data which is not related to the present invention and therefore is not shown herein.

After passing through the printing elements the strip S is fed under a feeding roll 160 which cooperates with a pressure roll, not shown, to advance the strip forwardly and out of the machine. The operation of the feeding roll 160 will be described in detail below.

An ink ribbon 263 is led from a supply reel 264 over the stationary printing member 299 and over the printing wheels 155. In front of the printing wheels 155, guide rollers 265 are provided around which the ink ribbon 263 passes before returning under the printing wheels 155 and under another printing device 31 to a rear guide roller also designated 265 and a rewind reel 266. The usual reversing mechanism may be employed for the ribbon and feeding mechanism to advance it after it is used as is a standard practice and is well known in the art.

The record strip R of paper or the like, which is to be retained by the business establishment for its permanent records and as a source of original entries, is led from a supply roll 260 under a guide roller 261 and thence upwardly and to the right, Fig. 2, around another guide roller 261'. The roller 261' is identical in function to a similar roller shown in my aforesaid patent but is located a little farther to the right, Fig. 2, or to the rear, Fig. 1, than in my aforesaid patent to provide space for the insertion of the printing unit 31 mentioned above and to be described in detail hereinafter. From the roller 261' the record strip R is led under the mechanism 31 and thence forwardly under the type wheels 155, over another guide roller 261" and thence downwardly to a rewind roll 511 mounted on a shaft 262.

The printing wheels 155 are designed to print numerical data, usually representing the amounts involved in various transactions which the cash register is adapted to record. As shown in Figs. 2 and 3, each of the wheels 155 is provided with two sets of digits, that is, each wheel has twenty printing elements thereon. Hence, inasmuch as identical printing elements are spaced 180° from each other on the periphery of each of the type wheels 155, the positioning of a particular digit at the top for printing in cooperation with the platen element 296 on the strip S likewise positions a corresponding digital character at the bottom in printing relation with respect to the record strip R. A platen lever 530 carries platen elements 531 and 532 for cooperation with the type wheels and with an individual plate or token carried in the holding unit 31 mentioned above. Means comprising cams mounted on the shaft 194 and connecting links for the lever 300 which are shown and described in detail in my aforesaid patent are provided for actuating the platen elements at the proper time to produce printing impressions, from the various printing elements mentioned, on both strips S and R. The particular operation of the mechanism for printing on the strip R will be described in detail below.

The strip S is advanced by the feeding roll 160 and means are provided for moving the feeding roll through variable distances to obtain variable lengths of feeding steps. As described more fully in my aforesaid patent, the feeding roll 160 is mounted on a shaft 161 and a gear 174 also mounted on the same shaft is adapted to be rotated in both directions by an oscillating sector 175 which is pivoted on the shaft 194 which carries the type wheels and their operating sleeves. A pawl 163 is mounted so as to oscillate with the gear 174. On counterclockwise movement of gear 174 as imparted thereto by the gear segment 175, the pawl 163 drags idly over the teeth of a ratchet wheel 162 which is secured to the feed roller 160 for rotation therewith. On clockwise rotation of the gear 174 the pawl 163 engages the teeth of ratchet wheel 162 and causes the roller 160 to rotate clockwise and advance the strip forwardly or to the left, Fig. 2.

The length of the feeding step imparted to the strip S by the feed roll 160 is determined by the angle through which the feed roll 160 rotates and this in turn is determined by the angle through which the gear segment 175 is permitted to oscillate. A stop 196 which is normally positioned within an opening or slot 195' in the gear segment or sector 175 serves to limit the arc through which the sector may be moved. This movement is merely sufficient to advance the strip S a distance corresponding to that between consecutive lines of type such as the first five numerical entries on the receipt illustrated in Fig. 4. However, as more fully described in my aforesaid patent, the stop 196 may be moved inwardly toward the shaft 149 so as to clear the end of an arm 195 carried by the sector 175 and thereby permit much greater oscillation of the gear segment and hence to permit a larger feeding step. The means by which this larger step is imparted to the feeding roller is described in detail in my patent but it is to be noted that such a means is provided as will become more fully apparent when the modification described in Fig 3 is discussed in detail. The sector 175 is oscillated about the shaft 149 by a cam, not shown, which is carried by the cam shaft 194. Necessary connecting linkages are provided and spring means which cause the cam followers to remain in engagement with the cam surfaces unless retracted by the positioning of the stop 196 are provided for obvious reasons and are described in my aforesaid patent.

The record strip R is provided in the form of a supply roll 260 which is mounted upon a shaft 401 provided with a braking mechanism 402 which is periodically released to permit the record strip to be fed but is normally held operative to prevent unrolling of the strip. A link 177 contains an elongated slot 416' which is mounted upon the shaft 194 in such a manner as to permit longitudinal sliding movement. The link 177 carries a cam follower 417 which cooperates with a cam 416 carried by the shaft 194. A spring 176 is provided for holding the cam follower in position against the cam 416. Additional elements are shown in my aforesaid patent but the elements shown in Fig. 2 are sufficient to illustrate the control of the brake upon the roll 260 from which the record strip R is supplied.

The rewind roller 511 previously mentioned is driven by mechanism which is very similar to that employed for driving the feed roller 160. Thus as shown in Fig. 2, the rewind roller carries a pawl 512 which engages teeth on a ratchet 513 which rotates with a gear 514 in such a manner that upon counterclockwise motion of the gear 514 and the ratchet wheel 513, the rewind roller is rotated. Upon reverse or clockwise movement of the gear 514 the ratchet runs idly under the pawl 512. Oscillating motion is imparted to the gear 514 by a gear segment 515 pivotally mounted on a shaft 516. An arm 517 extends rearwardly from the sector 515, being integral therewith, and is connected to the lower end of a link 518 by a pin 519. The upper end of the link 518 is connected to the front end of a lever 521 by means of a pin 522. The lever 521 carries a cam follower, not shown, which is operated by a cam carried by the shaft 194. The lever 521 is pivoted at its rear end on shaft 279 and hence rotation of the cam causes the lever 521 to be raised and lowered periodically which rocks the gear segment 515 about its pivotal shaft 516 imparting rewinding operations to the roller 511. The extent of the feeding step is determined by the design of the cam which operates the lever 521.

Mention was made above of the platen arm 530 which carries platen elements 531 and 532 for cooperation respectively with printing elements on the type wheels 155 and with an individual plate or token as 500 carried by the holding device 31. As illustrated in Fig. 6, the holding device 31 comprises a channel member 560 which has flanges 561 and 562 turned downwardly and inwardly to slidably receive an individual token or plate 500. As shown in Fig. 8, the channel member 560 is provided with a pin 563 which extends downwardly from the upper inner surface thereof in a position to fit a slot or notch as 535 cut or formed in the plate or token 500. As shown in Fig. 9, the token or plate 500 is provided with a notch in each end, such notches being indicated at 565 and 566. It will be noted that these notches are not located in the middle of the end portions of the plate but are offset somewhat to one side of the longitudinal center line. The arrangement of the end notches in the plate and the pin 563 is such as to prevent improper insertion of the plate for a printing operation.

After the various items pertaining to a transaction are printed by the type wheels, and before the total is printed, the token or plate 500 is inserted into the holder 560 through the opening 20, Fig. 1. On the next operation where the total is printed on the strips S and R, the name and address of the customer are simultaneously printed on the strip R in properly spaced relation with respect to the final total, as shown in Fig. 5.

An opening 564 is provided near the front or outer end of the channel member to receive a feeler pin as 545, Figs. 2, 3, 7 and 8. Then as the plate 500 is properly inserted, as shown in Fig. 8, the notch 565 engages the pin 563 and the notch 566 in the other end of the plate clears the opening 564 to permit the free insertion of the feeler pin 545. However, if the plate is not properly positioned within the channel member, for example if it is inverted, the notch 566 does not clear the opening 564 and insertion of the feeler pin 545 is prevented.

The feeler pin 545 is slidably mounted in a housing 544 secured to the upturned forward end of an arm 541. The pin 545 is provided with an enlarged portion or cross pin 546 as best shown in Fig. 7, and the lower portion thereof is surrounded by a light compression spring 547. At its lower end the slidable pin 545 contacts the extended portion 548 of an electrical contact 549 which is normally in contact with another element 550 so as to close an electrical circuit to conductors 551 and 552.

The arm 541 is pivotally mounted upon the shaft 279 and carries a cam follower 542 adapted to be moved periodically by a cam 543 mounted on the cam shaft 194. At an appropriate time in the operating cycle of the cash register the cam 543 raises the arm or lever 541 to insert the feeler pin 545 into the opening 564 in the channel member 560. If the opening is clear, that is if a plate is properly inserted or if no plate is being used, the pin 545 enters the opening unimpeded and the contacts 549 and 550 remain closed. However, if a plate is only partially inserted or if it has been inverted so that the pin 563 prevents its full insertion, the pin is prevented from entering the opening 564 and as the arm 541 is raised by cam 543 the contacts 549 and 550 are opened, breaking the circuit through conductors 551 and 552. Breaking the circuit interrupts the operation of the cash register and the operating cycle cannot be completed until the plate is properly positioned.

As mentioned above the modification shown in Fig. 3 of the accompanying drawings utilizes many of the same elements as are employed in the modification shown in Fig. 2. Briefly the sales slip or receipt S is fed from a supply roller 157A mounted on shaft 158A. The strip is led around a guide roller 159A over a printing unit 299A which in this instance does not bear fixed or unchangeable data but receives a plate to print therefrom in the same manner as the holding device 31 shown in Fig. 2 and described above. In other words, the unit 299 which was used for printing fixed or unchangeable data on the receipt as shown in Fig. 4 is replaced by a plate holding device. The platen arm 300A carrying platen elements 296A, 297A, 310A and 311A is mounted for pivotal movement upon shaft 273A in precisely the same manner as the element 300 mentioned above in connection with Fig. 2. The strip S passes between these platen means and the associated printing elements including the type wheels 155A to a feeding roll 160A operated by a pawl 163A, ratchet means 162A and a gear 174A, all mounted on a shaft 162A. These elements are operated by a gear sector 175A pivotally mounted on the shaft 149A in the manner described above in connection with Fig. 2. Inking means comprising an ink ribbon 263A led from a supply roll 264A over guide rollers and to a rewind roll 266A are identical with those described in connection with Fig. 2.

The record strip R is led from a supply roll 260A to the rear of the machine beyond the cam shaft 194 and associated elements, this arrangement being different from that shown in Fig. 2. The web passes beneath and around a guide roller 261A and thence up to another guide roller 261B positioned near the guide roller 159A previously mentioned. At this point the record strip R and the sales receipt strip S are nearly in contact and they run together toward the front of the machine. The strip S passes through printing elements, under the feeding roller 160A and out of the machine and the strip R likewise follows the same path until it reaches guide roller 261C. From guide roller 261C the strip R is led downwardly to rewind mechanism which is identical to that described in connection with Fig. 2. In this modification strip R is provided with a carbon coating on the back surface thereof. Printing on the lower portions of the printing wheels 155A is dispensed with in this modification and therefore the platen elements such as 530 shown in Fig. 2 are omitted. The record strip R with carbon coating on its rear or upper face and the receipt strip S are led over the printing unit 299A which comprises a channel member identical with that shown in Fig. 8 except that it is inverted so as to dispose the printing characters on a token or plate upwardly. A positioning pin corresponding to the pin 563 in Fig. 8 is provided to receive a notch in the token or plate and hence to determine its proper insertion. The platen element 310A directly above the channel member 560 is provided with an opening 564B which registers with the opening 564A in the channel member. As noted in Fig. 3, even when the platen is in retracted position, the space between the element 310A and the surface of the printing plate or token 500 is not very great. Feeler mechanism 540A which is substantially identical with that described in connection with Figs. 2 and 7 includes a longer feeler 545A adapted to project through the opening 564A and into the opening 564B in the platen element 310A unless impeded by an improperly inserted plate in the channel member 560. Hence, if a plate or token is properly inserted in the channel member or if no plate is being used, rotation of the cam 543, Fig. 7, lifts the arm 541A, Fig. 3, to insert the pin 545A through the opening 564A and into the opening 564B and the contacts 549 and 550, Fig. 7, remain closed. If a plate is only partially inserted or is improperly positioned in the channel member, upward movement of the arm 541A compresses the spring 547A and opens the contacts interrupting the machine as previously described.

In both modifications, Figs. 2 and 3, the paper strips are of a width which does not interfere with the insertion of the feeler 545 or 545A into the openings as described above. The feeler is positioned at one side of the printing apparatus so as to clear the paper strips, otherwise the contacting of a paper strip might render the apparatus inoperative in the same manner as in the contacting of an improperly positioned plate within the channel holding members.

In the above description reference has been made to the use of a token or plate 500 such as is illustrated in Figs. 8 and 9. It will be understood, however, that various types of identification plates may be employed in my apparatus. The plate shown in Fig. 9 is one of standard commercial pattern which is widely used. Another plate also of well known pattern is illustrated in Fig. 10. This plate comprises a metal sheet 500A with rolled edges 501A and embossed characters representing the name, address, and if desired, an account number or serial number, as shown in the drawings. At one end and disposed at one side of the center line, a notch 565A is provided for the same purpose as the notch 565 in the plate shown in Fig. 9. At or near its other end the plate is provided with an opening 566A which may be used to receive the sensing pin 545 in the manner in which the notch 566 of the plate illustrated in Fig. 9 receives such a pin. Obviously the width of the channel member and the location of the pin 563 and the opening 564, Fig. 8, would be adjusted to fit the particular type of plate being employed. Hence, the cash register would be provided with a plate holding device such as the channel member 560 fitted to receive plates of a pattern authorized for use in the particular establishment. Plates of improper design which might be used by other commercial establishments could not be used in this apparatus and hence a measure of security against the improper use of plates is afforded. It is obvious that a channel member 560 could be made of various shapes and that various plate sensing and locating elements could be provided so as to require the use of plates of any desired configuration. Normally, however, means in addition to the particular configuration of the identification plate would be provided for insuring the use of plates which are issued by the particular business establishment and the exclusion of unauthorized plates or plates issued by other organizations.

In connection with the two modifications described and illustrated in Figs. 2 and 3 it should be noted that each has certain advantages. In the modification described in connection with Fig. 2, original printing is produced on both strips S and R, avoiding the necessity for using carbon paper which is sometimes objectionable. On the other hand, the modification shown in Fig. 2 does not include any means by which a customer's name and address are printed upon the receipt issued to him. As indicated above in connection with Figs. 4 and 5, a transaction serial number may be printed by means shown in my aforesaid patent and not necessary to describe here, which will key the issued receipt to the record retained in the machine. By this means the transaction may be identified and correlated with the issued receipt without the necessity of providing the customer's name on the receipt issued to him. There may be occasions, however, where it is considered highly desirable or necessary to print the customer's name on the receipt issued to him as well as upon the record retained by the business establishment. When this is required, the modification shown in Fig. 3 is preferably employed. This modification makes it possible to print identification data upon both the receipt strip S and the record strip R, the former being printed by the carbon coated back of the record strip.

It will be noted that the use of either modifications involves only minor changes in the cash register mechanism per se. For example, the use of the modification shown in Fig. 2 involves only the relocation of guide roller 261, the provision of a cam on shaft 194 and the operating elements 515, 516, 518 and 521 for the rewind roller. This latter modification is required because the feeding steps imparted to the record strip in the machine described in my patent mentioned hereinabove are not of sufficient extent to permit the printing of data carried by an individual plate or token between entries of numerical data. The sensing mechanism 540 is of course required for either form of apparatus if it is considered desirable to sense the proper insertion of a plate or token into printing position. Where the strip R is rewound in the machine and does not correspond in every detail to the receipt issued to the customer it is considered highly desirable to provide the plate or token sensing means to guard against improper or incomplete printing of the data carried by the plate or token. However, in the modification shown in Fig. 3 where the receipt carries the complete data, it is possible by casual inspection to ascertain that the data has been correctly entered and the plate or token sensing means may not be necessary under some conditions.

The modification shown in Fig. 3 requires the replacing or relocation of guide rollers 261A, 261B and 261C. The changing of the stationary printing unit 299, described in my patent referred to above, to a plate holding element incorporating a channel member such as the unit 560 shown in Fig. 8 involves only a very minor modification of the standard cash register.

It will be understood that an electric motor usually is employed to operate cash registers of the general type to which this invention pertains. Current for such motor is normally supplied so as to operate the cash register, including the printing mechanism through a complete cycle when an entry is to be recorded. The conductors 551 and 552 and the contacts 549 and 550 are preferably connected either in series with such a motor or in series with a solenoid which, in turn, controls the motor circuit. In either case operation of the motor and cash register mechanism is interrupted on opening of contacts 549 and 550, and this occurs preferably early in the cycle, for example, before the cam shaft 194 or 194A has moved far enough to operate the printing platen arms 300, 300A or 530. Interruption of the operation of the motor indicates to the operator that the plate or token 500 or 500A is not properly inserted and this condition must be corrected before operation is resumed.

A plate or token having a notch in one end only and at an off-center position cannot be fully inserted in the plate holder if placed upside down therein or if turned end for end. Hence the pin 563 alone is sufficient to insure proper insertion of the plate 500A. However, if a plate such as shown in Fig. 9 is employed, the plate holder 569, Fig. 8, should be so shaped that the plate cannot be inserted if turned upside down. Since plates of the character shown in Fig. 9 have dissimilar flange portions on their two faces, the plate holder 560 can easily be formed so as to receive only plates which are properly oriented to present the raised printing characters toward the strip to be printed. Inasmuch as the notches 565 and 566 are off center, the plate 500, with such an arrangement, cannot be fully inserted if turned end for end. Hence by proper forming of the channeled plate holder, and by proper location of the stop pin and the feeler opening, any one of various types of plates may be accommodated and its proper use assured. The channeled plate holder 560 preferably has its flanges 561 and 562 somewhat widened and enlarged as shown at 561A and 562A, Fig. 8, to facilitate the insertion and removal of a plate or token into and out of printing position.

Since the identification data peculiar to each individual changes with each token or plate, such data is referred to in some of the appended claims as changeable data, or as identification data in some cases, in accordance with terminology which has become accepted in the art to which this invention pertains. Likewise data pertaining to the amount of a transaction, the items therein as well as the total, which may vary with each transaction, is referred to in certain claims as variable data. Printed data which does not vary from one transaction to another, and which does not change as different plates or tokens are used, may be referred to as fixed or unchanging data. Thus, in Figs. 4 and 5, the data 701 are referred to as changeable data or identification data, data 702 are referred to as variable data, and data 703 are referred to as fixed or unchanging data. The series of selective type wheels 155 or 155A by means of which variable data are printed are referred to collectively as a variable printer. Obviously all three types of data may be printed on both strips S and R, although as a general rule fixed or unchanging data would not be printed on the record strip R and, with the arrangement shown in Fig. 2, identifying or changeable data would not be printed on the receipt or sales strip S.

As indicated above, the mechanisms for advancing strips R and S are arranged to feed such strips in steps of varying lengths to accommodate the data printed. For example, when items of variable data 702 are being printed on either strip, it is necessary to advance that strip only an amount equivalent to one line spacing. When a sub-total or a total is printed, it may be desirable to increase the feed step, and when changeable data, as a name and address is to be printed, a feed step of an additional amount may be necessary, for example three of four line spaces. Fixed data printed on the strip S by the printing element 299 also requires a longer feeding step. The particular arrangement of cams by which these various feeding steps are accomplished, and the means by which they are placed in operation, are not described herein, being well known in the art. Ordinarily the operation of printing a total places in operation cam mechanism which feeds both strips a sufficient amount to receive all the data desired including, if desired, an additional amount for end margin on the receipt strip S.

To summarize the operation of my apparatus, an identification plate 500 or 500A is presented by an individual, a customer of a retail store, for example, as authority for a charge transaction. The sales person records the various items, shown in Figs. 4 and 5 as $7.66, $4.55, $1.77, $1.50, and $2.40 and the cash register computes and records their subtotal as $17.82. Appropriate means may be provided for printing an indication that this is a charge transaction. A sales tax entry is next recorded and then, before recording the final total, the customer's plate or token is inserted in the holder 560 and the register tripped to record both the total and the identifying data on the plate. If the plate is properly inserted, printing occurs after the strips are advanced appropriate amounts, and the receipt or sales slip and the plate or token are handed to the customer. If the plate is not properly inserted in the holder, operation is suspended until this condition is corrected and then printing is accomplished and the transaction is completely recorded.

It will be apparent from the above description that my invention makes it possible to use a cash register to effect completed entries of business transactions in standard cash register equipment and to take advantage of the prevalent and increasing use of individual identification tokens and plates carried by customers and the like. It is apparent that this invention has numerous commercial advantages and makes possible the simplification of business procedures and the elimination of much detail work, at the same time providing increased insurance against loss through mistakes and errors.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claim.

I claim:

In a cash register having a housing, feeding means within said housing operable to feed a record strip along a predetermined path therein, and settable type elements disposed at a point along said path for printing engagement with said strip at a first printing station, a printing plate holder securely mounted within said housing and accessible therethrough and adapted for insertion and positioning of a printing plate therein for printing engagement with said strip at a point along said path defining a second printing station, said holder being provided with an opening in its base the entrance of which is adapted both for ingress and egress by a reciprocable detector pin and closure by a portion of a printing plate defining an improper positioning thereof in said holder, impression members at each of said printing stations, actuating means for said members, and means to disable said actuating means when an improperly inserted printing plate is effective to cover the opening in said holder, said last-named means comprising an arm located adjacent said holder and automatically reciprocating at right angles relative to the base thereof during a normal printing cycle, and a depressable detector pin carried on said arm for sliding movement in the plane of its longitudinal axis, which axis is in substantial alignment with the opening in said holder, said pin being free at one end and movable with said arm during a normal printing cycle to a non-depressed terminal position determined by said arm movement and the free ingress of said end into said holder opening when the latter is closure-free, the other end of said slidable and reciprocable pin being in contact during a normal printing cycle with interrupting means for said actuating means, whereby, when an improperly positioned printing plate is effective to close said holder opening said pin is stopped short of its normal terminal position and is thereby depressed away from said holder in its slidable mounting to cause said interruptor to disable said impression member actuating means.

JOHN H. GRUVER.

REFERENCES CITED

The following references are of record in the file of this patent:

UNITED STATES PATENTS

| Number | Name | Date |
| --- | --- | --- |
| 1,056,765 | Ohmer | Mar. 18, 1913 |
| 1,091,498 | Friedlein | Mar. 31, 1914 |
| 1,261,147 | Martin | Apr. 2, 1918 |
| 1,254,825 | Martin | Jan. 29, 1918 |
| 1,385,788 | Kirshner | July 26, 1921 |
| 1,539,382 | Thompson | May 26, 1925 |
| 1,858,813 | Wheelbarger | May 17, 1932 |
| 1,865,147 | Shipley | June 28, 1932 |
| 1,866,997 | Bryce | July 12, 1932 |
| 1,984,706 | Slettevold | Dec. 18, 1934 |
| 2,003,219 | Pearson | May 28, 1935 |
| 2,154,381 | Gruver | Apr. 11, 1939 |
| 2,257,949 | Gruettner | Oct. 7, 1941 |